United States Patent
Urich et al.

(10) Patent No.: US 11,442,437 B2
(45) Date of Patent: Sep. 13, 2022

(54) MULTIVARIABLE MODEL PREDICTIVE CONTROLLER

(71) Applicant: Lehigh University, Bethlehem, PA (US)

(72) Inventors: Matthew Urich, Souderton, PA (US); Rama Rao Vemula, Allentown, PA (US); Mayuresh V. Kothare, Slatington, PA (US)

(73) Assignee: LEHIGH UNIVERSITY, Bethlehem, PA (US)

( * ) Notice: Subject to any disclaimer, the term of this patent is extended or adjusted under 35 U.S.C. 154(b) by 707 days.

(21) Appl. No.: 16/446,828

(22) Filed: Jun. 20, 2019

(65) Prior Publication Data

US 2019/0391571 A1     Dec. 26, 2019

Related U.S. Application Data (60) Provisional application No. 62/687,493, filed on Jun. 20, 2018.

(51) Int. Cl.
*B01D 53/047*     (2006.01)
*G05B 19/418*     (2006.01)
(Continued)

(52) U.S. Cl.
CPC ... *G05B 19/41885* (2013.01); *B01D 53/0454* (2013.01); *B01D 53/0473* (2013.01);
(Continued)

(58) Field of Classification Search
CPC ............... B01D 53/04; B01D 53/0454; B01D 53/0473; B01D 53/047; B01D 2253/104; B01D 2253/106; B01D 2253/108; B01D 2256/12; B01D 2257/102; B01D 2257/80; B01D 2258/06; B01D 2259/40009; B01D 2259/4533; C01B 3/56; C01B 13/0259; C01B 13/027; G05B 13/048; G05B 19/41885; G05B 2219/41146; G06F 7/58; Y02C 20/40
(Continued)

(56) References Cited

U.S. PATENT DOCUMENTS

| 5,906,672 A | 5/1999 | Michaels |
|---|---|---|
| 8,226,745 B2 | 7/2012 | Siew-Wah |

(Continued)

OTHER PUBLICATIONS

Matthew D. Urich, Rama Rao Vemula, and Mayuresh V. Kothare. "Multivariable model predictive control of a novel rapid pressure swing adsorption system." AIChE Journal. vol. 64, No. 4, Apr. 2018, pp. 1234-1245.

(Continued)

*Primary Examiner* — Frank M Lawrence, Jr.
(74) *Attorney, Agent, or Firm* — Fisherbroyles, LLP (57) ABSTRACT

Systems and methods presented herein provide for multivariable model predictive control of a multistep plant. In one embodiment, a model predictive controller (MPC) includes a model of the multistep plant. The MPC is operable to linearize at least two steps of the multistep plant into cycle steps based on the model, to process an output signal from the multistep plant, and to independently control the cycle steps based on the output signal to optimize an output of the multistep plant.

36 Claims, 7 Drawing Sheets

(51) Int. Cl.
*G05B 13/04* (2006.01)
*B01D 53/04* (2006.01)
*C01B 13/02* (2006.01)
*G06F 7/58* (2006.01)

(52) U.S. Cl.
CPC .......... *C01B 13/027* (2013.01); *G05B 13/048* (2013.01); *B01D 2253/108* (2013.01); *B01D 2256/12* (2013.01); *B01D 2259/40009* (2013.01); *B01D 2259/4533* (2013.01); *G05B 2219/41146* (2013.01); *G06F 7/58* (2013.01)

(58) Field of Classification Search
USPC ........ 95/1, 8–23, 96, 130, 139; 96/109–114, 96/121; 128/204.21
See application file for complete search history.

(56) References Cited

U.S. PATENT DOCUMENTS

| | | | |
|---|---|---|---|
| 8,400,798 B2* | 3/2013 | Bagarelli | H02M 3/157 |
| | | | 363/132 |
| 9,649,589 B2 | 5/2017 | Vemula | |
| 2006/0233701 A1* | 10/2006 | Parias | C01B 3/384 |
| | | | 423/648.1 |
| 2010/0242722 A1* | 9/2010 | Belanger | B01D 53/0462 |
| | | | 96/111 |
| 2015/0273391 A1* | 10/2015 | Won | B01D 53/229 |
| | | | 96/4 |

OTHER PUBLICATIONS

Urich MD, VemulaRR, KothareMV. Multi-Model Predictive Control of a Novel Rapid Pressure Swing Adsorption System. Proceedings of the American Control Conference. May 2017, pp. 4392-4397.

Vemula Rama Rao, Mayuresh V. Kothare, and Shivaji Sircar. "Novel design and performance of a medical oxygen concentrator using a rapid pressure swing adsorption concept." AlChE Journal, vol. 60, No. 9, pp. 3330-3335, Sep. 2014.

* cited by examiner

MULTIVARIABLE MODEL PREDICTIVE CONTROLLER

CROSS REFERENCE TO RELATED APPLICATIONS

This patent application claims priority to, and thus the benefit of an earlier filing date from, U.S. Provisional Patent Application No. 62/687,493 (filed Jun. 20, 2018), the contents of which are hereby incorporated by reference.

STATEMENT OF GOVERNMENT INTEREST

The present application was made with government support under National Science Foundation Grant No. PFI AIR: TT #1444963 and 1-Corps #1402128. The government has certain rights.

BACKGROUND

Model predictive control may be used in a variety of processing systems, such as chemical plant processing. Model predictive control has the ability to anticipate future events of a process and control the process accordingly. For example, a first control signal may be applied to a process and a new sequence of control signals may be calculated when a new output measurement is obtained. Model predictive control is often implemented in digital control systems by employing predictive control algorithms. The predictive control algorithms are generally based on an assumed model of the process and on an assumed scenario for future control signals. The assumed models are often obtained through system identification of the plant process. However, these models often rely on many assumptions and variables. A faulty system identification of a process may lead to poor control of the process. And, model predictive control is often too computationally intensive to be practical for nonlinear models.

SUMMARY

Systems and method presented herein provide for multivariable model predictive control of a multistep plant. In one embodiment, a model predictive controller (MPC) includes a model of the multistep plant. The MPC is operable to linearize at least two steps of the multistep plant into cycle steps based on the model, to process an output signal from the multistep plant, and to independently control the cycle steps based on the output signal to optimize an output of the multistep plant.

The various embodiments disclosed herein may be implemented in a variety of ways as a matter of design choice. For example, the system and method embodiments hereof may take the form of computer hardware, software, firmware, or combinations thereof. Other exemplary embodiments are described below.

BRIEF DESCRIPTION OF THE FIGURES

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles that are included within the scope of the embodiments. Furthermore, any examples described herein are intended to aid in understanding the principles of the embodiments and are to be construed as being without limitation to such specifically recited examples and conditions. As a result, the embodiments are not limited to any specific examples described below.

Figure 1:
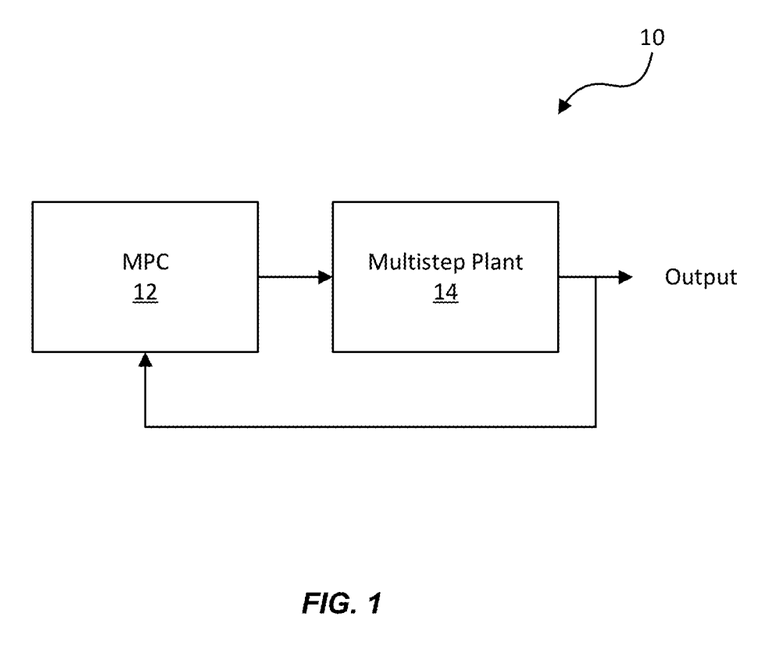
FIG. 1 is a block diagram of an exemplary model predictive control system.

FIG. 1 is a block diagram of an exemplary model predictive control system 10. In this embodiment, the system 10 includes an MPC 12 that is communicatively coupled to a multistep plant 14 to independently control various process steps of the multistep plant 14. For example, the MPC 12 may monitor an output of the multistep plant 14 and generate a plurality control signals to independently control the process steps within the multistep plant 14 to optimize future outputs.

The MPC 12 is any device, system, software, firmware, or combination thereof operable to generate a model of the multistep plant 14 and to independently control the process steps of the multistep plant 14. Examples of the MPC 12 include computing systems, such as embedded controllers including memory and storage devices. The multistep plant 14 is any system with multiple process steps to produce an output. Examples of the multistep plant 14 include chemical plants producing an output and having multiple process steps that can be modeled through system identification. For example, a medical oxygen concentrator (MOC) may purify oxygen ($O_2$) from ambient air using a cyclic multistep Rapid Pressure Swing Adsorption (RPSA) process. Once a model of the MOC is generated through system identification, the MPC 12 may independently control various "cycle steps" of the RPSA process to optimize the output of the MOC (i.e., purified oxygen, $O_2$). Other examples of multistep plant processes include hydrogen separation plant processes, air pre-purification plant processes (e.g., water removal), carbon dioxide capture processes, air separation processes, and cardiac device processes, to name a few.

Figure 2:
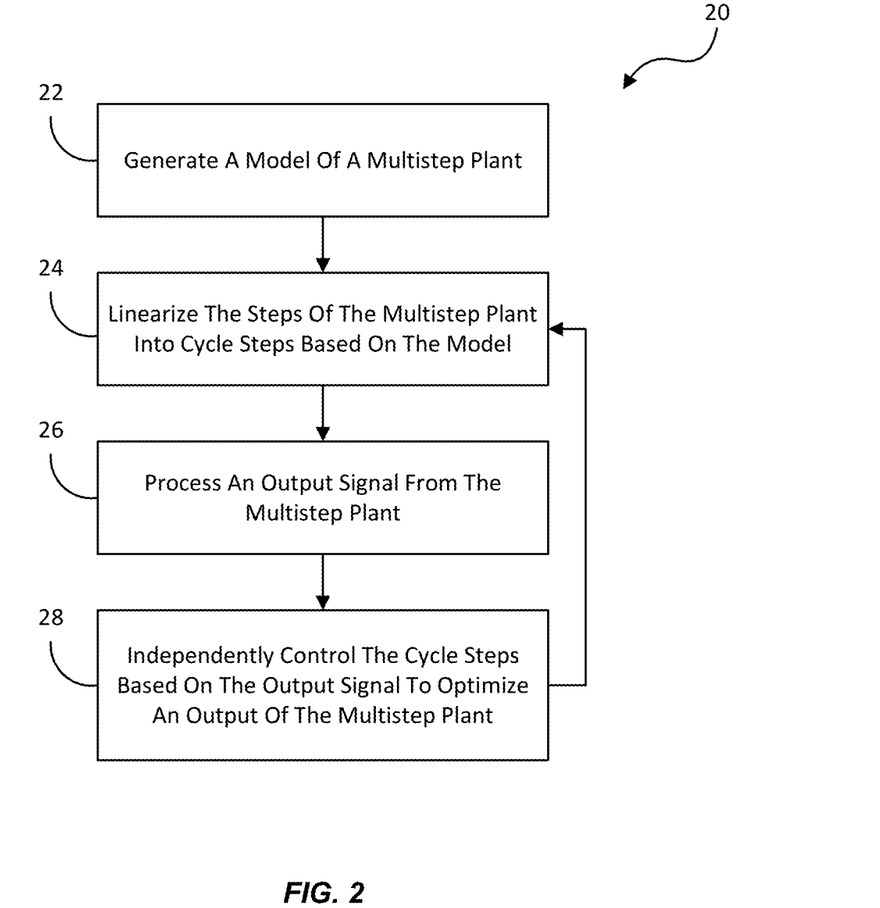
FIG. 2 is a flowchart of an exemplary process of the model predictive control system of FIG. 1.

FIG. 2 is a flowchart of an exemplary process 20 of the model predictive control system 10. In this embodiment, the MPC 12 may generate a model of the multistep plant 14, in the process element 22. For example, the MPC 12 may stimulate the multistep plant 14 with various control signals and monitor process steps of the multistep plant 14 to build a statistical model of the multistep plant 14. The MPC 12 may then linearize the steps of the multistep plant 14 into cycle steps based on the model, in the process element 24. For example, the overall process of the multistep plant 14 may be dynamic and nonlinear. The MPC 12 may monitor each step in the overall process to determine discrete linear components of each step in the process. The MPC 12 may generate linear functions of each step, referred to herein as cycle steps. From there, the MPC 12 may process an output signal of the multistep plant 14 (e.g., a feedback signal), in the process element 26, to generate a plurality of control signals. The control signals may then be used to independently control each subsequent cycle step to optimize an output of the multistep plant 14, in the process element 28.

Figure 3:
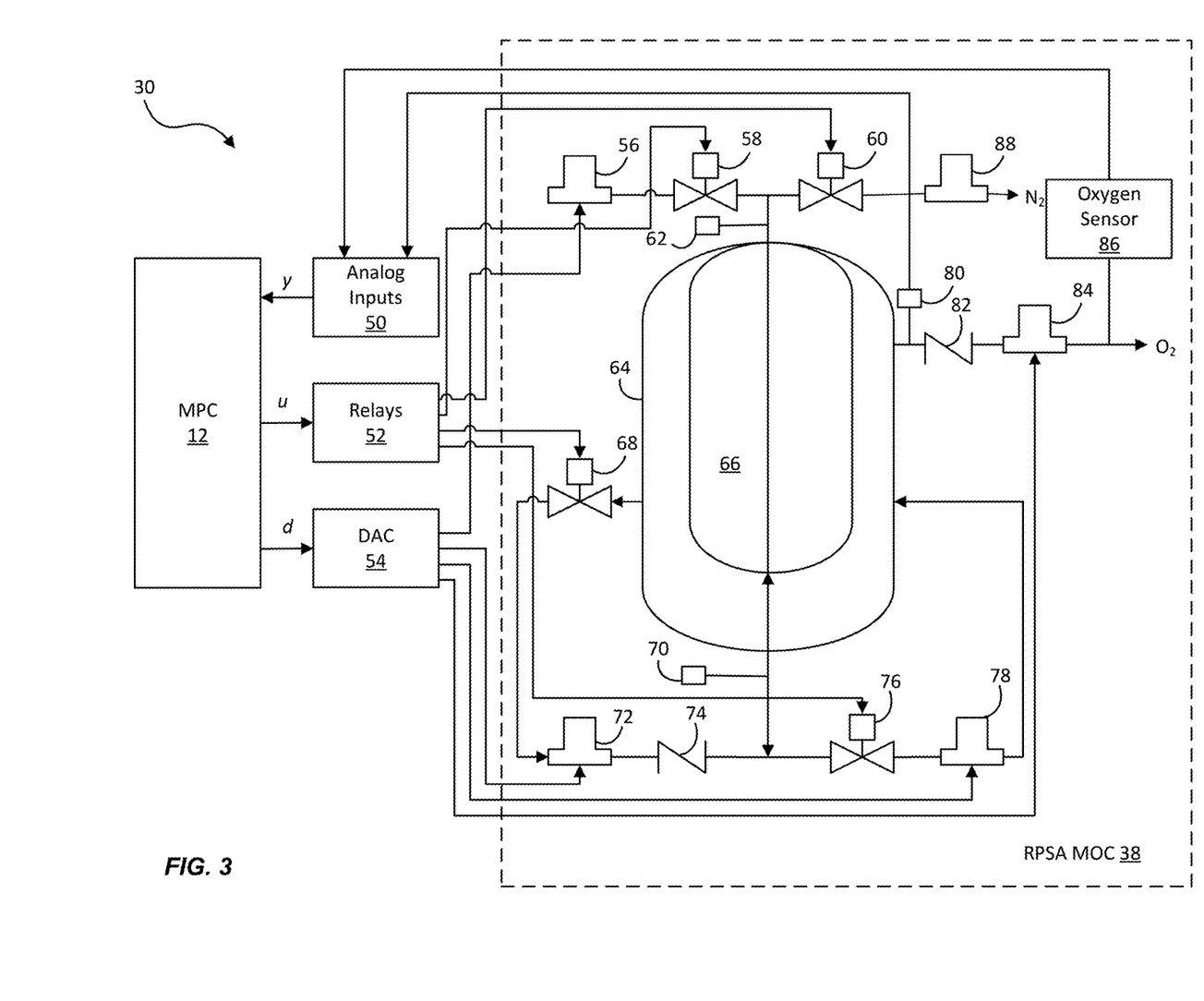
FIG. 3 is a schematic of an exemplary MPC operable to control a Rapid Pressure Swing Adsorption (RPSA) medical oxygen concentrator (MOC).

As mentioned, the MPC 12 may be used to independently control the process steps of an RPSA MOC. FIG. 3 illustrates a block diagram of a system 30 that includes the MPC 12 controlling an RPSA MOC 38, in one exemplary embodiment. The RPSA MOC 38 may be operable to perform bulk gas separation of oxygen ($O_2$) from ambient air to provide approximately 90% $O_2$. In this embodiment, the RPSA process generally employs total cycle times, $t_c$, of less than ten seconds. And, a pelletized, $N_2$ selective LiX or LiLSX zeolite may be used as an air separation adsorbent in the RPSA MOC 38. However, the adsorbent may be any known $N_2$ selective molecular sieve. In one embodiment, the pelletized zeolite comprises bound particles of LiX zeolite crystals having a particle diameter of about 300 to about 1000 micron, and even more particularly, a diameter of about 300 to about 700 micron.

Generally, the design goals for the RPSA MOC 38 include: (a.i) a reduction of a bed size factor, or "BSF" (e.g., the total amount of adsorbent in the unit/ton per day of oxygen production rate), which may lower adsorbent inventory and result in a more compact and light weight unit); (a.ii) enhancement of percentage $O_2$ recovery, R, by the process (e.g., the amount of $O_2$ in product gas/amount of $O_2$ in feed air per cycle×100(%)), which may decrease an air compressor size, reduce power, and result in a lighter unit with longer battery life (e.g., for portable units).

In some embodiments, a four-step "Skarstrom PSA" cycle or some variation thereof may be adapted for use in the RPSA MOC 38. For example, this process may include: (b.i) selective adsorption of $N_2$ from compressed air by flowing air at a super-ambient adsorption pressure ($P_a$) over a packed column of zeolite (e.g., adsorbent column 66) to produce an $O_2$ enriched effluent gas which is partly withdrawn as the product gas; (b.ii) counter-current depressurization of the column 66 to a near ambient final desorption pressure level ($P_d$); (b.iii) counter-current back purge of the column 66 at $P_d$ with a part of the $O_2$ enriched product gas; and (b.iv) re-pressurization of the column 66 from $P_a$ to $P_d$ using fresh compressed air (co-current) and/or part of the $O_2$ enriched product gas (counter-current). The cycle is then repeated and the $N_2$ enriched column effluent gases from steps (b.ii) and (b.iii) are emitted as waste products.

The embodiments herein may reduce the BSF, and in turn may reduce the total cycle time, $t_c$, of the RPSA MOC 38, increase the cyclic frequency of operation, and enhance the net rate of $O_2$ production. A higher $O_2$ recovery may be obtained by preserving a portion of the air-like void gas in the column 66 at the end of step (b.i) by using it to partially pressurize a companion column (e.g., pressure equalize) before step (b.ii) begins in order to reduce the loss of void gas $O_2$ during step (b.ii). The amount of back purge gas may also be minimized while maintaining the product gas purity (e.g., $O_2$) in order to reduce BSF and increase the $O_2$ recovery. The adsorbent column 66 may also be used in the RPSA MOC 38 to accommodate the pressure equalization step. The column 66 may also be used to produce a continuous product stream so that when one column is undergoing step (b.i), the companion column carries out steps (b.ii)-(b.iv).

In one embodiment, the MPC 12 is configured as an embedded controller that controls operation the RPSA MOC 38 by measuring the $O_2$ composition and system pressure and reactively adjusting the RPSA cycle step durations. In one embodiment, the MPC 12 may include a control algorithm implemented on Raspberry Pi controller using Python code language. Of course, any suitable controller and programming language may be used. The MPC 12 may also include digital hardware to manipulate RPSA cycle step durations as well as gas flow and pressure controllers used by the RPSA MOC 38.

To illustrate, a nonlinear plant model of the RPSA MOC 38 may be used to study the dynamics of the system. The plant model is generally a fully coupled, nonlinear set of Partial and Ordinary Differential Equations (PDEs and ODEs, respectively) which act as a representation of the RPSA MOC 38's operations. A sub-space model identification technique using Pseudo-Random Binary Sequence (PRBS) input signals may be used to generate a linear model to reduce the computational cost of the MPC 12, thereby allowing implementation with an embedded controller. This multivariable MPC 12 may then independently manipulate the RPSA MOC 38 cycle step durations to control both the product composition and pressure.

The MPC 12 may also solve a convex quadratic optimization in real time using online output measurements. Additional hardware in the MPC 12 may be used to operate the RPSA cycles and implement control actions supplied by the MPC 12. The MPC 12 uses the linear model and the optimization to make optimal control decisions for the RPSA MOC 38. For example, at each sample point, k, the MPC 12 may use past measurements to estimate the current system states. The MPC 12 may use a linear model to predict the system dynamic response over a set prediction horizon to chosen manipulated input changes. The MPC 12 may choose these input changes, or control actions, over a given control horizon to yield an optimal system response according to a given optimization objective. The MPC 12 may then implement a first control action, and the calculation is repeated at the next sample point, k+1. An example of the MPC 12 is shown and described in greater detail below.

Generally, the RPSA MOC 38 includes an RPSA process that relies on phenomena known as gas adsorption and desorption. Adsorption is the adhesion of a gaseous species onto a solid surface due to an attractive force between the gas and solid, and desorption is the removal of the gas species from the solid surface. RPSA is a cyclic process, where an adsorbent is synchronized to continuously separate a feed gas mixture by increasing and decreasing the gas pressure in the adsorbent column 66. In one embodiment, the RPSA generally has a total cycle time of less than 10 seconds.

During a pressurization step, the column 66 is pressurized to a super atmospheric pressure (Pa) with feed air a via mass flow controller 56 and the opening of a solenoid valve 58 with solenoid valves 60, 68, and 76 being closed. In the adsorption step, feed air is continuously supplied to the column 66, and high purity $O_2$ product leaves the column 66 and enters a storage tank 64 until the adsorbent bed is saturated with nitrogen, via opening of the solenoid valve 76 and a mass flow controller 78. The $O_2$ leaves the RPSA MOC 38 as product via the check valve 82 and the mass flow controller 84. During blow down, nitrogen is desorbed from the adsorbent bed of the column 66 by reducing pressure on the column 66 to atmosphere via the opening of the solenoid valve 60 and the closure of the solenoid valves 58, 68, and 76. And, the nitrogen gas $N_2$ is discarded through the solenoid valve 60 and the mass flow meter 88. In the purge step, the solenoid valve 60 remains open and the column 66 is back purged using some of the high purity $O_2$ in the storage tank 64 via the opening of the solenoid valve 68, entering the storage tank 64 through the mass flow controller 72 and the check valve 74. Pressure sensors 62, 70, and 80 and mass flow meter 88 provide feedback, y, to the MPC 12 to control the opening and closing of the solenoid valves 58, 60, 68, and 76 during the process as analog inputs 50 to the MPC 12. And, an oxygen sensor 86 provides $O_2$ purity feedback (as another analog input 50, y, to the MPC 12) such that the MPC 12 can manipulate the cycle times of the opening and closing of the solenoid valves 58, 60, 68, and 76 during the process to optimize the $O_2$ purity (e.g., via control signals, u, from relays 52). The MPC 12 may also include a digital to analog converter (DAC) 54 to convert digital control signals, d, from the MPC 12 to analog signals that control the mass flow controllers 56, 72, and 78 during the process.

In this regard, generally high purity $O_2$ product is continuously supplied during all four steps. And, after the purge step, fresh compressed feed air is supplied and the RPSA repeats. The duration of each RPSA cycle step can be independently manipulated by the MPC 12, and has a coupled, nonlinear effect on the system dynamics the RPSA MOC 38.

In one embodiment, the column 66 also includes a desiccant. Suitable desiccants include, for example, alumina, silica gel, etc. Generally, a particle diameter of at least 1 mm may be used.

As described above, the MPC 12 controls the actuation of one or more valves in the system 30 to control the pressure of the column 66 and product storage space in the storage tank 64, and to control the cycle times of the RPSA MOC 38. The MPC 12 may make control decisions every RPSA cycle using a process model and a quadratic optimization problem. In particular, the MPC 12 may use a reduced-cost model that can be efficiently solved, rather than a detailed nonlinear plant model that is too computationally intense. The optimization may focus on set-point tracking with integral action to reduce output oscillations. The MPC optimization problem can be formulated as a convex quadratic optimization program with linear inequality constraints such that the MPC 12 can independently manipulate all four cycle steps durations of the RPSA cycle to control both the product $O_2$ composition as well as the storage tank pressure. This constitutes a multivariable control problem.

The optimization problem may be solved in real-time as the RPSA MOC 38 is running, with computation times in the order of a second or less. In one embodiment, the MPC 12 generates a model of the RPSA MOC 38 via an experimental data-driven model identification approach using Pseudo-Random Binary Sequence (PRBS) signals as design variables to simultaneously perturb the four cycle step durations and then measure the resulting output composition and pressure. These PRBS signals are generally determined experimentally and may be unique to the RPSA MOC 38. The MPC 12 has the capability to switch between multiple identified local linear models to expand the operating regime of the RPSA MOC 38, which may be of relevance in other oxygen concentrator applications (e.g., fish tanks, veterinary medicine, etc.). The MPC 12 improves the performance of the RPSA MOC 38 by maintaining $O_2$ purity and rejecting undesired and unmeasured process disturbances which would otherwise degrade the RPSA MOC 38 performance.

With the model, the MPC 12 may be operable to control and selectively vary cycle step times of the four steps of the RPSA cycle, in response to detected changes in environmental and/or operating conditions (e.g., product composition, tank pressures, etc.). Notably, this is may be accomplished by the MPC 12 obtaining measurements from sensors (e.g., pressure sensors 62, 70, and 80, mass flow meter 88, and oxygen sensor 86) of the RPSA MOC 38, during operation of the RPSA MOC 38. The MPC 12 may make calculations as a function of sensor-detected values/feedback, and the MPC 12 may control the valves and/or other process parameters during operation of the RPSA MOC 38, in particular to vary step times, without interrupting operation of the RPSA MOC 38 or delivery of the oxygen flow from the RPSA MOC 38. In this manner, the RPSA MOC 38 can respond to changes or disturbances in operating conditions, and therefore accommodate a broader range of operating conditions, while still meeting desired product compositions and flow rates.

In one embodiment, the system 30 has a BSF of about 30 to about 60 lbs/TPD $O_2$, an R value of 25-35%, a cycle time of steps (a)-(d) of 3-8 seconds, and produces at least about 90% $O_2$ enriched product gas.

In modeling the RPSA process, certain assumptions may be made. First, the ideal gas law holds true (i.e., PV=nRT, where P, V, and T are the pressure, volume and absolute temperature, respectively, n is the number of moles of gas, and R is the ideal gas constant). Next, radial effects are negligible, the column is non-isothermal and adiabatic, and pressure drop follows the Ergun Equation. A radial effect is generally any concentration, pressure, and/or temperature difference at a center of a packed adsorbent column 66, which may be more significant when compared to an outer rim of the adsorbent column 66. Also, mass transfer between the gas and solid phases follows a Linear Driving Force (LDF) model, Langmuir isotherms describe the adsorption equilibrium, heat transfer occurs between the gas and solid phases, and feed air is generally a 79% $N_2$ and 21% $O_2$ binary mixture.

From this, a total mass balance model equation in the adsorbent column 66 is:

$$\frac{\partial \rho_g}{\partial t} = \frac{\bar{\epsilon}}{\epsilon} D_L \frac{\partial^2 \rho_g}{\partial z^2} - \frac{1}{\epsilon} \frac{\partial Q}{\partial z} - \frac{\rho_b}{\epsilon} \sum_{i \in \{O_2, N_2\}} \frac{\partial n_i}{\partial t} \qquad (\text{Eq. 1})$$

and the component mass balance equation for component i is:

$$\frac{\partial (y_i \rho_g)}{\partial t} = \frac{\bar{\epsilon}}{\epsilon} D_L \frac{\partial^2 (y_i \rho_g)}{\partial z^2} - \frac{1}{\epsilon} \frac{\partial (y_i Q)}{\partial z} - \frac{\rho_b}{\epsilon} \frac{\partial n_i}{\partial t}, \qquad (\text{Eq. 2})$$

where $\rho_g$ is the total gas density, Q is the molar flux through the column 66, $n_i$ is the fraction of species i adsorbed in the solid phase, $x_i$ is the mole fraction of species i in the gas phase, $\epsilon$ and $\bar{\epsilon}$ are the helium and bed void fractions respectively, $D_L$ and $\rho_b$ are the effective axial mass dispersion coefficient and the bulk density, respectively, and z is the axial distance through the adsorbent column 66.

The mass transfer between the gas and solid phases is modeled by the LDF model using experimentally determined Langmuir isotherms as:

$$\frac{\partial n_i}{\partial t} = k_i(n_i^\infty - n_i), \quad (Eq.\ 3)$$

where $k_i$ and $n_i^\infty$ are the LDF mass transfer coefficient of the species i and the equilibrium fraction of the species i. Langmuir isotherm models for adsorption of $O_2$ and $N_2$ are:

$$n_i^\infty = \frac{mb_i P y_i}{1 + \sum_{i \in O_2, N_2} b_i P y_i}; \quad (Eq.\ 4)$$

$$b_i = b_{i0} \exp\left(\frac{q_i^0}{RT_g}\right).$$

The Ergun Equation to estimate the pressure drop along the column is:

$$\frac{\partial P}{\partial z} = -\frac{150\mu}{\rho_g d_p} \frac{(1-\bar{\epsilon})^2}{\bar{\epsilon}^3} Q - \frac{1.75\ M_g}{\rho_g d_p} \frac{1-\bar{\epsilon}}{\bar{\epsilon}^3} Q^2, \quad (Eq.\ 5)$$

where $\mu$, $d_p$ and $M_g$ are the viscosity, particle diameter and gas mixture molecular weight, respectively, and P is the pressure of the column 66.

The gas phase energy balance equation is:

$$\epsilon C_{pg} \frac{\partial(\rho_g \theta_g)}{\partial t} = \epsilon C_{pg} D_g \frac{\partial(\rho_g \theta_g)}{\partial z^2} - C_{pg} \frac{\partial(Q\theta_g)}{\partial z} + h_{gs}a(\theta_s - \theta_g) \quad (Eq.\ 6)$$

$$\theta_g = T_g - T_f,$$

and, the solid phase energy balance equation is:

$$\rho_b C_{ps} \frac{\partial \theta_s}{\partial t} = \rho_b \sum_{i \in \{O_2, N_2\}} q_i \frac{\partial n_i}{\partial t} - h_{gs}(\theta_s - \theta_g) \quad (Eq.\ 7)$$

$$\theta_s = T_s - T_f,$$

where $\theta_g$, $\theta_s$, $T_g$, $T_s$, and $T_f$ are the differential gas temperature, differential solid temperature, gas temperature, solid temperature and feed temperature, respectively, $C_{pg}$, $D_g$, $h_{gs}$, and a are the gas specific heat, the effective axial heat dispersion coefficient, the gas-solid heat transfer coefficient and the effective surface area, respectively, $C_{ps}$ and $q_i$ are the solid phase heat capacity and the heat of adsorption for species i, respectively.

Each RPSA cycle step uses Eqs. 1-7 to describe the column dynamics, but flow reversals may define the RPSA cycle. Each cycle step may have a unique set of boundary conditions which change to reflect each step's behavior. The following table, Table 1, gives a comprehensive list of boundary conditions in the RPSA plant model, where $\alpha_i$ and $\beta_i$, are coefficients of a polynomial valve equation, and G is the purge to feed ratio.

TABLE 1

Boundary and Initial Conditions for the RPSA Model

| RPSA Cycle Step | z = 0 | z = L |
|---|---|---|
| Pressurization | $-D_L \frac{\partial(\chi_i \rho_g)}{\partial z} = \frac{Q}{\bar{\epsilon}}(\chi_{i,f} - \chi_i)$ | $\frac{\partial(\chi_i \rho_g)}{\partial t} = 0$ |
|  | $-D_g \frac{\partial(\rho_g \theta_g)}{\partial z} = \frac{Q}{\bar{\epsilon}}(\theta_f - \theta_g)$ | $\frac{\partial(\rho_g \theta_g)}{\partial z} = 0$ |
|  | $Q = \Sigma_{i=1}^{6} \alpha_i (P_f - P)^{7-i}$ | $Q = 0$ |
| Adsorption | $-D_L \frac{\partial(\chi_i \rho_g)}{\partial z} = \frac{Q}{\bar{\epsilon}}(\chi_{i,f} - \chi_i)$ | $\frac{\partial(\chi_i \rho_g)}{\partial t} = 0$ |
|  | $\frac{\partial P}{\partial z} = 0$ | $P = P_\alpha$ |
|  | $Q = Q_f$ | $\frac{\partial Q}{\partial z} = 0$ |
|  | $-D_g \frac{\partial(\rho_g \theta_g)}{\partial z} = \frac{Q}{\bar{\epsilon}}(\theta_f - \theta_g)$ | $\frac{\partial(\rho_g \theta_g)}{\partial z} = 0$ |
| Blow Down | $\frac{\partial(\chi_i \rho_g)}{\partial t} = 0$ | $\frac{\partial(\chi_i \rho_g)}{\partial t} = 0$ |
|  | $\frac{\partial(\rho_g \theta_g)}{\partial z} = 0$ | $\frac{\partial(\rho_g \theta_g)}{\partial z} = 0$ |
|  | $Q = \Sigma_{i=1}^{6} \beta_i (P - P_{atm})^{7-i}$ | $Q = 0$ |
| Purge | $\frac{\partial(\chi_i \rho_g)}{\partial t} = 0$ | $D_L \frac{\partial(\chi_i \rho_g)}{\partial z} = G\frac{Q}{\bar{\epsilon}}(\chi_{i,T} - \chi_i)$ |

TABLE 1-continued

Boundary and Initial Conditions for the RPSA Model

| RPSA Cycle Step | z = 0 | z = L |
|---|---|---|
| | $P = P_{atm}$ | $\frac{\partial P}{\partial z} = 0$ |
| | $\frac{\partial Q}{\partial z} = 0$ | $Q = -GQ_f$ |
| | $\frac{\partial(\rho_g \theta_g)}{\partial z} = 0$ | $-D_g \frac{\partial(\rho_g \theta_g)}{\partial z} = G\frac{Q}{\epsilon}(\theta_f - \theta_g)$ |
| Initial Conditions | $\chi_i(z,0) = \chi_{i,f};\ P(z,0) = P_T(z,0) = P_a;\ \theta_g(z,0) = \theta_s(z,0) = T_f - T_{atm}$ | |
| | $Q(z,0) = 0;\ \chi_{O2,T}(0) = 0.90$ | |

The model of the storage tank 64 is generally a pair of ODEs which make two further assumptions: 1. the storage tank pressure is a function of time; and 2. the storage tank temperature is constant at atmospheric conditions, and not modeled, as follows:

$$V_T \frac{dP_T}{dt} = F(P|_{z=L,t} - P_T) - F_P(P_T - P_{atm}) \qquad \text{Eq. 8}$$

$$\frac{d(y_{iT} P_T)}{dt} = \frac{F}{V_T}((y_i P)|_{z=L,t} - y_{iT} P_T) - \frac{F_P}{V_T} y_{iT}(P_T - P_{atm}), \qquad \text{Eq. 9}$$

where $P_T$ and $\chi_{i,T}$ are the total pressure and mole fraction of species i in the storage tank 64, and $V_T$, F, $F_P$ and $P_{atm}$ are the storage tank volume, flow rate of gas between the column 66 and the tank 64, product flow rate and atmospheric pressure, respectively. The challenge in modeling the RPSA system is sequentially solving the different cycle steps. All steps generally use the same model equations, but in the column model, the boundary conditions change to different flow reversals. In the tank model, the parameter F changes to different flows between the column 66 and the tank 64. During the pressurization and blow down steps, there is no flow between the column 64 and the tank 66, and F=0 for these steps. In the adsorption step, gas flows from the column 66 to the tank 64 according to the time-dependent solution of Eqns. 1-7. The flow between the column 66 and tank 64 may be given as:

$$F = \frac{QART_g}{P}\bigg|_{z=L} \qquad \text{Eq. 10}$$

And, during the purge step, the flow from the tank 64 to the column 66 is a constant fraction of the feed conditions, and the flow may be given as, $$F = \frac{QART_g}{P}\bigg|_{z=L}. \qquad \text{Eq. 11}$$

The RPSA cycles can reach a "cyclic steady state" (CSS) where the cycle profiles of the system states reach a constant, time-invariant form. The RPSA cycle profile returns to a constant form at CSS. This CSS property may be useful for identifying the control problem for the RPSA system.

Feedback control may reduce or eliminate inter-cycle dynamics when process disturbances occur. Because of the rapid cyclic operation, controlling the entire cycle profile of the controlled variables may be practically infeasible using the MPC 12. Thus, an alternative definition of the CSS property assists in mitigating this issue. Instead of considering the entire cycle profile of a system state, the CSS can be defined as the point where all states have the same value at the beginning and end of the RPSA cycle. A cycle referencing strategy can then be used to capture the necessary dynamic information without overwhelming the MPC 12 with too much information. Choosing a cycle reference point reduces the measurement requirements in the system 30 and makes controlling the RPSA cycle feasible. But, choosing the correct reference point may be needed for capturing relevant information.

The end of the purge step is an advantageous choice for the cycle reference point for two reasons: 1. the product composition in the tank 64 usually only changes in the pressurization and adsorption steps, so waiting to measure composition until after purge may reduce any sensor measurement delay effects which are common in composition sensors; and 2. the tank pressure during the purge step should be high enough to ensure flow such that the pressure decreases during the purge step. If the MPC 12 maintains a high enough pressure after the purge step, the pressure also may be high enough during the entire purge.

The storage tank pressure ($P_T$) and $O_2$ composition ($\chi_{O2,T}$) at the end of the purge step may be controlled by manipulating the four RPSA cycle step durations, ($t_p$, $t_a$, $t_{bd}$, $t_{pu}$). The MPC 12 aims to reduce or eliminate the undesired inter-cycle dynamics caused by changes in several disturbance variables. The MPC 12 is able to account for and utilize the coupled relationship between the four step durations and the controlled variables because a process model and input constraints can be directly imposed on the MPC 12 such that the MPC 12 can independently manipulate the four cycle step durations.

Sub-space identification may be used to identify the RPSA process model via specially designed input signals and measured output responses. In one embodiment, Pseudo-Random Binary Sequence (PRBS) input signals are chosen because they can continuously excite the RPSA system with relatively small amplitudes, and can be implemented into real systems. A linear model, identified around a known baseline operating point, can accurately predict the RPSA dynamics in a narrow range in which the RPSA operates. The chosen baseline input vector, $\bar{u} = [\bar{t}_p, \sqrt{t_a}, \bar{t}_{bd}, \bar{t}_{Pu}]$ and measured output vector, $\bar{y} = [\chi_{o2,T}, P_T]$ may be used in designing the PRBS input signals. And, the four variables, [

$\bar{t}_p$, $\overline{t_a, t_{bd}, t_{Pu}}$], may be manually manipulated without feedback control until the desired purity of $O_2$ is achieved.

The tank pressure may also be monitored during this process to ensure that it is super-atmospheric, so that the purge and product flow rates can be maintained. The baseline value of tank pressure is generally the value when the composition is sufficient. The baseline operating point may be summarized in Table 2.

TABLE 2

Summary of the Chosen Baseline Operating Point for the RPSA MOC

| Parameter | Chosen Value | Measured Value |
|---|---|---|
| $\bar{t}_p$ [sec] | 0.18 | — |
| $\bar{t}_a$ [sec] | 0.384 | — |
| $t_{\bar{b}d}$ [sec] | 0.73 | — |
| $t_{\bar{p}u}$ [sec] | 0.36 | — |
| $\chi_{O2, T}$ | — | 0.90 |
| $\bar{P}_T$ [barA] | — | 1.5 |

Once a baseline operating point is chosen, the RPSA plant model (e.g., Eqs. 1-7) may be perturbed around this operating point using specially designed PRBS input signals. The PRBS signals may be designed and optimized experimentally in simulation to meet the following objectives: 1. each cycle step duration is perturbed using a PRBS-type signal with large enough perturbations to elicit a dynamic response, but not so large as to move the RPSA far from its operating point; and 2. the PRBS signals should be as short as possible to minimize the length of the simulation to identify the model. Once the system is identified, a linear model of the process can be generated and the MPC 12 can manipulate the variables to independently control the cycle steps of the RPSA process based on the feedback from the RPSA MOC 38.

Figure 4:
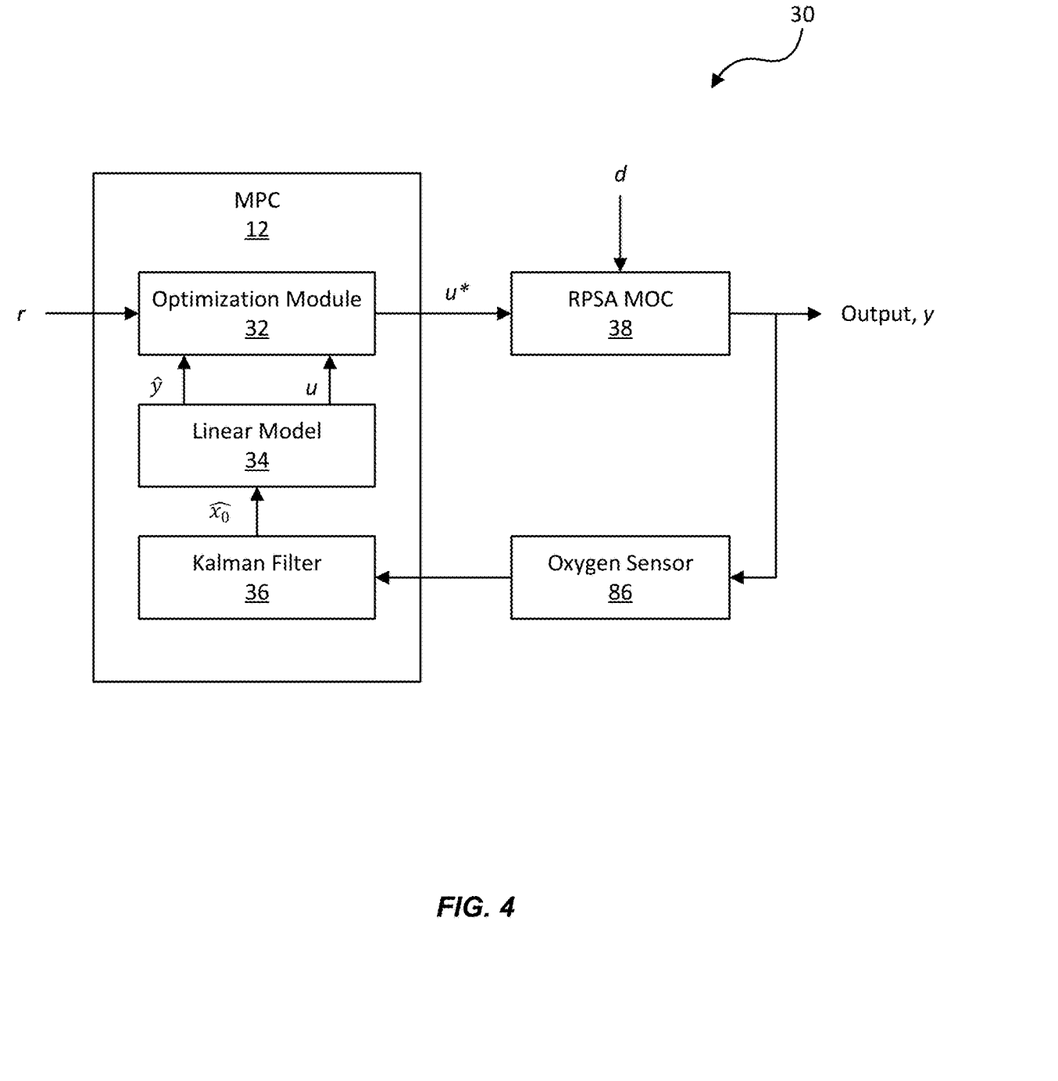
FIG. 4 is a block diagram of the exemplary MPC of FIG. 3.

FIG. 4 is a more detailed block diagram of the MPC 12. As mentioned, once the system is identified, a linear model of the RPSA process can be generated. For example, the linear model 34 may be identified using subspace identification methods via PRBS simulation data to form an eighth order discrete state space model as follows:

$$\hat{x}(k+i+1|k) = A\hat{x}(k+i|k) + Bu(k+i|k)$$

$$\hat{y}(k+i|k) = C\hat{x}(k+i|k) + Du(k+i|k) \quad \text{Eqs. 12 and 13}$$

In this embodiment, the MPC 12 uses a convex quadratic optimization module 32, the identified linear model (i.e., linear model 34), and a discrete Kalman filter 36 to provide the model's initial condition as follows:

$$\hat{x}(k+1|k) = (A-LC)\hat{x}(k|k-1) + (B-LD)u(k|k) + Ly_m(k|k)$$

$$\hat{x}(k|k) = \hat{x}(k|k-1) + M_f(y_m(k|k) - C\hat{x}(k|k-1) - Du(k|k)) \quad \text{Eqs. 14 and 15}$$

The MPC 12 uses the identified linear model 34 to predict system behavior in response to the manipulated inputs. The MPC 12 may also account for mismat$_c$h between the identified model and the actual plant model, and the effect of unanticipated disturbances on output variables. This observer model addresses this issue by using the current output measurements to estimate the current state of the system, $\hat{x}(k|k)$, and the MPC 12 may use this estimation as its initial condition to solve the quadratic program in the optimization module 32.

The Kalman observer gain matrix, L, may be computed from the solution of a corresponding algebraic Ricatti Equation, and the innovation matrix, $M_f$, may be used as a free parameter to improve the accuracy of the observer predictions of the PRBS validation data. The observer gain matrix may be chosen such that the discrete linear observer model is stable, $|\lambda(A-LC)| \le 1$.

As mentioned, the MPC 12 independently manipulates all four step durations to control both the product oxygen concentration and tank pressure. The MPC 12 formulation may operate as follows.

$$\min_{\substack{u(k+i|k) \\ i=1,2,\ldots,M-1}} \sum_{i=1}^{N} [y(k+i|k) - r(k+i|k)]_{\omega_1}^2 + \sum_{i=2}^{M} [\Delta u(k+i|k)]_{\omega_2}^2 \quad \text{Eq. 16}$$

$$\text{s.t. } \hat{x}(k+i+1|k) = A\hat{x}(k+i|k) + Bu(k+i|k)$$

$$y(k+i|k) = C\hat{x}(k+i|k) + Du(k+i|k)$$

$$u_{min} \le u(k+i|k) \le u_{max}, i = 1, 2, \ldots, M-1$$

$$y_{min} \le y(k+i|k) \le y_{max}, i = 1, 2, \ldots, N$$

where $\omega_1$ is the weighting matrix for the vector of the two controlled variables, and $\omega_2$ is the weighting matrix for the vector of the four manipulated inputs. A decision vector, $u(k+i|k) = [t_p(k+i|k) \ t_a(k+i|k) \ t_{bd}(k+i|k) \ t_{pu}(k+i|k)]^T$, is the sequence of cycle step times over the prediction horizon of current and future cycles (i=0, M-1). The objective function ensures set point tracking and penalizes large input changes.

As the MPC 12 is a multiple input/multiple output (MIMO) controller, special attention to tuning may ensure proper performance. After standard scaling of output variables, a composition set point may be weighted higher than the pressure set point to ensure the RPSA process delivers the ~90% oxygen. Output deviations from the set point may be penalized explicitly, as may be large manipulated input changes. The identified model may be imposed as a constraint, and both inputs and predicted outputs are given bounds. For example, the first two constraints impose the identified linear model 34 on the MPC 12 and allows the controller problem to be reformulated as a quadratic program with linear constraints. The third constraint imposes the same lower and upper bounds imposed on the input variables during PRBS simulations.

Each term in the objective function can be tuned, and may have an effect on closed-loop performance. However, the coupled effects of the output variables may cause output oscillations around a CSS. Both output variables oscillate around their set points, and the MPC 12 oscillates the cycle step durations to correct this.

Integral action may be used in feedback control to eliminate steady state offset, and may be added to enhance the MPC 12's formulation. The updated MPC 12 with integral action is shown as:

$$\min_{\substack{u(k+i|k) \\ i=1,2,\ldots,M-1}} \sum_{i=1}^{N} [y(k+i|k) - r(k+i|k)]_{\omega_1}^2 + \quad \text{Eq. 17}$$

$$\sum_{i=2}^{M} [\Delta u(k+i|k)]_{\omega_2}^2 + \sum_{i=1}^{M} [u(k+i|k) - u_b(k+i|k)]_{\omega_3}^2$$

$$\text{s.t. } \hat{x}(k+i+1|k) = A\hat{x}(k+i|k) + Bu(k+i|k)$$

$$y(k+i|k) = C\hat{x}(k+i|k) + Du(k+i|k)$$

$$u_{min} \le u(k+i|k) \le u_{max}, i = 1, 2, \ldots, M-1$$

$$y_{min} \le y(k+i|k) \le y_{max}, i = 1, 2, \ldots, N,$$

where $u_b$ is the input baseline value used in the PRBS simulation, and $\omega_3$ is the weight matrix for the vector of the four manipulated inputs. When a process disturbance moves the outputs away from set point, the MPC 12 responds and alters the four step durations. The outputs eventually approach their set point, and the integral action recovers the manipulated inputs back to their baseline values, and brings the outputs back to set point at CSS.

In this embodiment, integral action may be thought of as the deviation of input variables from their baseline, or steady state values. In some instances, integral action in the MPC 12 includes deviation from steady state of both input and state vectors. The states in Eqs. 12 and 13 generally do not have physical meaning, and defining a steady state does not improve the MPC 12's performance. More useful to the MPC 12 is an objective term which captures deviation from steady state input signals and reduces output oscillations when close to the set point. Integral action may significantly decrease the MPC 12's response time and remove oscillations. Thus, the MPC 12's formulation in Eqs. 12 and 13 may be used in the closed loop system of the RPSA MOC 38.

Figure 5:
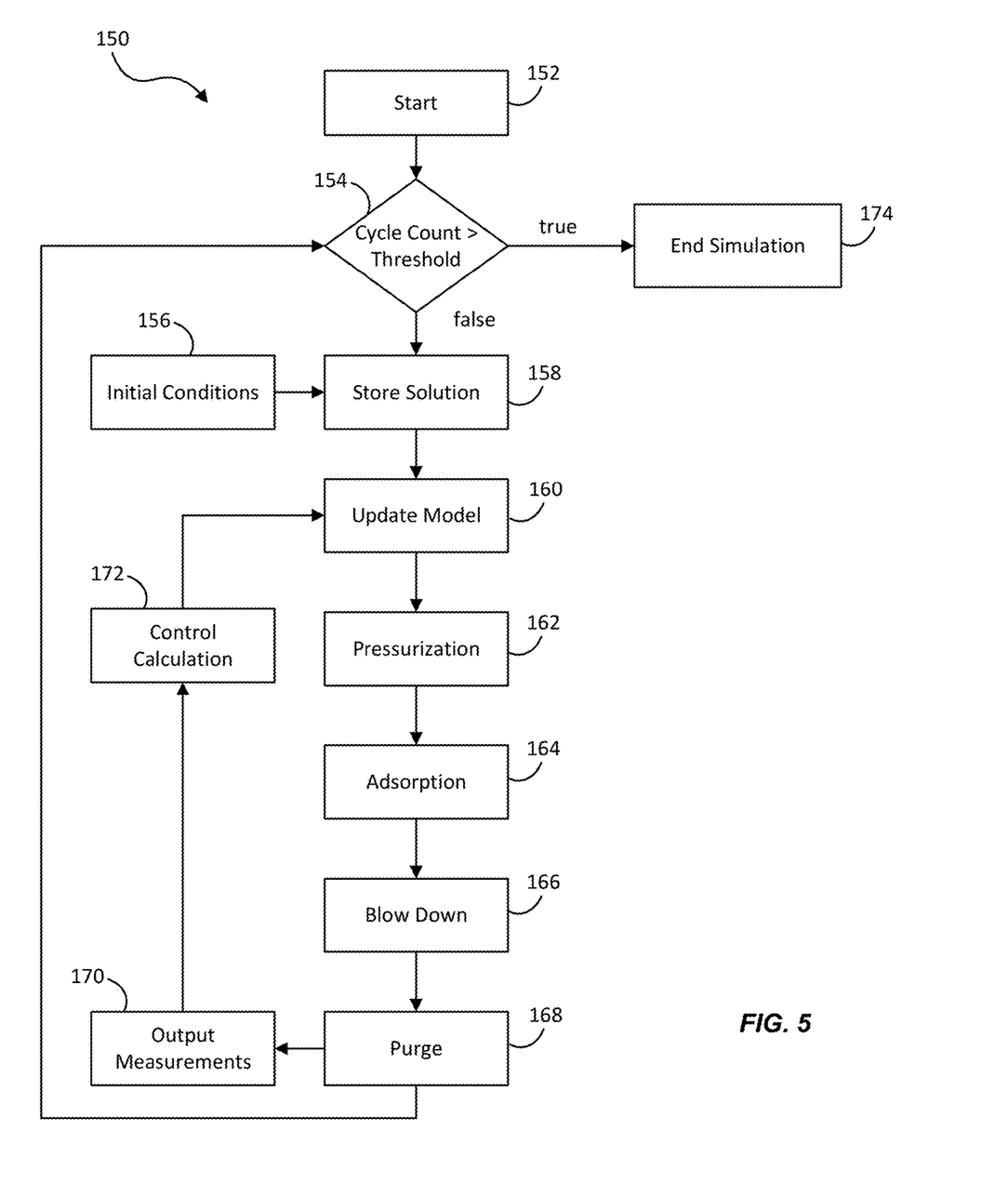
FIG. 5 is a flowchart of an exemplary system identification process.

FIG. 5 is a flowchart of a simulation process 150 used by the MPC 12 to identify the model of the RPSA MOC 38. In this embodiment, the MPC 12 starts, in the process element 152. Then, the MPC 12 determines whether a cycle count has breached a threshold, in the process element 154. For example, if the simulation process 150 is complete, the MPC 12 ends the simulation, in the process element 174. Otherwise, the MPC 12 initializes the simulation process 150. In this regard, the MPC 12 may be loaded with initial conditions, in the process element 156. For example, the MPC 12 may be loaded with initial cycle step durations and operating conditions of the RPSA MOC 38 such that the MPC 12 can compute and store a solution, in the process element 158, via the optimization module 32 and based on the linear model 34 of the RPSA MOC 38.

With the solution computed, the MPC 12 may update the linear model 34, in the process element 160. This linear model 34 may include various PRBSs that are used to stimulate the cycle steps of the RPSA MOC 38. In this regard, the MPC 12 may generate a plurality of control signals using the PRBSs to independently stimulate the cycle steps of the pressurization process (i.e., the process element 162), the adsorption process (i.e., the process element 164), the blow down process (i.e., the process element 166), and the purge process (i.e., the process element 168) of the RPSA MOC 38.

The MPC 12 may then obtain output measurements from the RPSA MOC 38, in the process element 170, via various pressure sensors, flowmeters, oxygen sensors, nitrogen sensors, etc. The MPC 12 may then calculate new control signals, in the process element 172, to update the linear model 34, in the process element 160. The simulation process 150 may then continue until the cycle count threshold is breached, in the process element 154. For example, after the purge process of the process element 168, the MPC 12 may return to the process element 154 to determine whether the cycle count reaches the threshold.1

Figure 6:
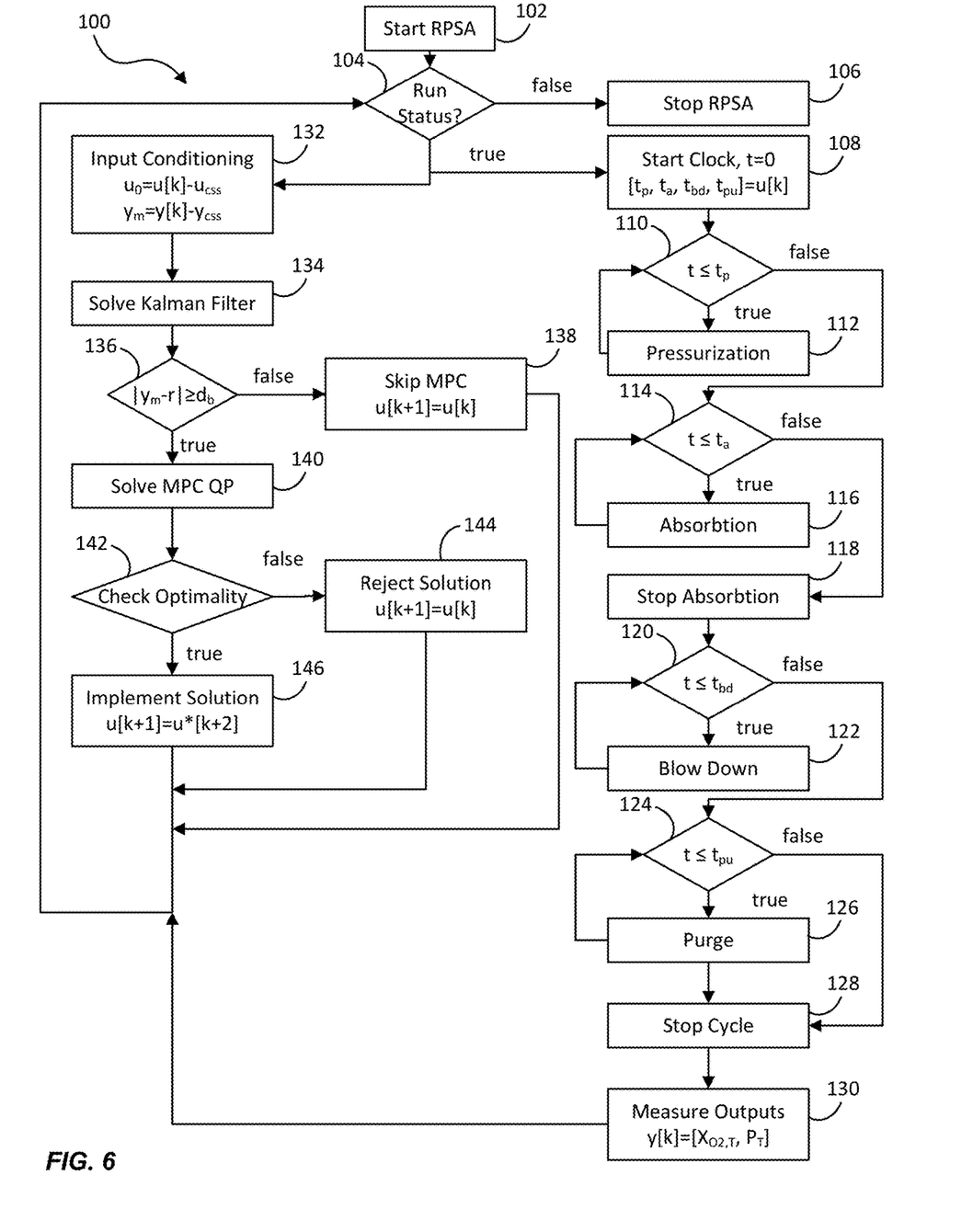
FIG. 6 is a flowchart of an exemplary MPC process operable with an RPSA MOC.

FIG. 6 is a flowchart of an exemplary process 100 implemented by the MPC 12 for controlling operation of the RPSA MOC 38 to vary process parameters and achieve enhanced performance under a broad range of operating conditions. Referring now to FIG. 6, the process starts with MPC 12 initiating operation of the RPSA MOC 38, in the process element 102. More specifically, this step involves operation of the RPSA MOC 38 to perform and repeat the sequential pressurization (process element 112), adsorption (process elements 116 and 118), blow down (process element 122), and purge (process element 126) steps. This generally involves controlling the various valves of the RPSA MOC 38, to open and close the valves, as described above. Alternatively or additionally, this may be performed according to initial default values or parameters, such as default cycle times. For example, each of the pressurization, adsorption, blow down and purge steps may have respective cycle times $t_p$, $t_a$, $t_{bd}$, $t_{pu}$ that may be set to 0.5-3.0 seconds by way of an initial default setting. This may enable reasonably effective operation of the RPSA MOC 38, even if the values are suboptimal.

Once started, the MPC 12 may determine whether the RPSA MOC 38 process is running, in the process element 104. If not, the MPC 12 stops the RPSA control process, in the process element 106. Otherwise, the MPC 12 may start a clock initialized to t=0, in the process element 108, with the initial cycle times $u[k]=[t_p, t_a, t_{bd}, t_{pu}]$. When the clock is started, the MPC 12 may configure the valves (e.g., the solenoid valves 60, 68, 76, and 88) for the pressurization step (i.e., the process element 112) by opening the feed valve (e.g., solenoid valve 58) and closing all other valves to pressurize the column 66 as shown and described above in FIG. 3. In doing so, the MPC 12 may send control signals to the corresponding valves via the DAC 54 and the electrical relays 52. The MPC 12 may monitor the time of pressurization $t_p$ and maintain the valves in this configuration for as long as the elapsed time t is less than or equal to the pressurization cycle time $t_p$, in the process element 110.

When $t_p$ is reached, the pressurization step ends, and the MPC 12 sends control signals to the corresponding valves (in similar fashion) to open the solenoid storage valve 76 to the storage tank 64 for product supply, while keeping the solenoid feed valve 58 open, and the solenoid exhaust and purge valves 60 and 68, respectively, closed to initiate the adsorption step in the process element 116. The MPC 12 may maintain the solenoid storage valve 76 in an open state to permit the purified oxygen to flow from the RPSA MOC 38 into the storage tank 64. The MPC 12 monitors the time of adsorption and maintains the valves in this configuration for as long as the elapsed time t is less than or equal to the adsorption cycle time $t_a$, in the process element 114.

When $t_a$ is reached, the adsorption step ends, in the process element 118, the MPC 12 sends control signals to the corresponding valves (in similar fashion) to close the feed and storage valves 58 and 76, respectively, and to open the exhaust valve 60 while keeping the purge valve 68 closed to initiate the blow down step, in the process element 122, the storage valve 76 is maintained in an open state to permit the purified oxygen to flow from the RPSA MOC 38. The MPC 12 again monitors the time and maintains the valves in this configuration for as long as the elapsed time t is less than or equal to the blow down cycle time $t_{bd}$ in the process element 120.

When $t_{bd}$ is reached, the blow down step (i.e., the process element 122) ends, the MPC 12 sends control signals to the corresponding valves (in similar fashion) to open the purge valve 68 while keeping the feed and storage valves 58 and 76, respectively, closed and the exhaust valve 60 open, to initiate the purge step, in the process element 126. During the purge step, the MPC 12 maintains the storage valve 76 in an open state to permit the purified oxygen to flow from the RPSA MOC 38. The MPC 12 monitors the time and maintains the valves in this configuration for as long as the elapsed time t is less than or equal to the purge cycle time $t_{pu}$, in the process element 124.

At this point, one full RPSA cycle has completed, in the process element 128, to repeat the next cycle. In this regard, the MPC 12 receives measurement outputs y[k]=[$\chi_{O2,T}$, $P_T$] from the RPSA MOC 38, in the process element 130, via the sensors of the RPSA MOC 38 (e.g., the pressure sensors 62, 70, and 80, the mass flow meter 88, the oxygen sensor 86, etc.). The MPC 12 may use this feedback for the purpose of controlling the next RPSA cycle of the RPSA MOC 38. These sensors may produce analog inputs 50 that are fed to the MPC 12, converted to digital inputs, and then processed by the MPC 12 as feedback input to the MPC 12. The MPC 12 may process the data to identify control parameters, such as the cycle times for each of the pressurization, adsorption, blow down, and purge steps, for a next RPSA cycle. Generally, the MPC 12 is capable of processing the data in less time than the duration of a single PRSA cycle. The MPC 12 is operable to do so due to the computational efficiency of the linear model 34, so as to be operable with an embedded controller, thereby reducing the overall size and weight of the system 30 for desired portability.

This processing on the left branch of the of the process 100 illustrates the sensory processing and subsequent cycle step computations which occur in real time and parallel to the steps on the right branch of the process 100. For example, the MPC 12 conditions the inputs to the model, in the process element 132. Generally, this includes converting the oxygen composition and pressure measurements obtained in the process element 130 as a deviation from a known operating point. Next, the MPC 12 solves the Kalman filter, in the process element 134 through matrix computations via the identified model 34. This provides an estimation of the current system performance and an initial condition needed to solve the quadratic optimization problem in the optimization module 32, in the process element 136. If the Kalman filter is not solved, then the MPC 12 process is skipped, in the process element 138, and the previous solution or some default solution is implemented, in the process element 146, for the subsequent RPSA cycle.

Next, the MPC 12 determines whether the output from the solution is optimal. For example, the MPC 12 may attempt to compute an "optimal" solution that satisfies the constraints imposed in the quadratic optimization problem to yield a minimal objective function, in the process element 140. If the optimal solution is found, in the process element 142, the MPC 12 implements the solution, in the process element 146. If the MPC 12 determines that the solution is non-optimal, in the process element 142, then the MPC 12 may reject the solution, in the process element 144, and revert to a previous solution or some default solution such that the RPSA cycle is not interrupted.

For example, the MPC 12 may implement newly determined cycle time parameters $t_p$, $t_a$, $t_{bd}$, $t_{pu}$ as feedback-based inputs for the next RPSA cycle, such that the pressurization, adsorption, blow down, and purge steps are performed according to their newly determined cycle times. The RPSA cycles and calculations repeat during operation of the system 30 to provide improved performance for the RPSA MOC 38, over a broader range of operating conditions, based on actual observations of RPSA MOC 38's performance on a real-time basis, until the RPSA process is terminated via the process element 104 and 106.

Based on the foregoing, the MPC 12 is operable to independently control and/or manipulate the cycle step durations to control both the $O_2$ composition and tank pressure in the RPSA MOC 38. In doing so, the MPC 12 uses a multivariable control problem and multivariable feedback control using composition and pressure measurements.

As environmental or other conditions change over time, the RPSA MOC 38 device adapts its operation to maintain or enhance its performance. In this manner, the MPC 12 overcomes the limitations of fixed or discrete operation control parameters consistent with prior art approaches. Furthermore, the embodiments herein do so with relatively fast and efficient computations to ensure real-time control of RPSA process with lightweight and small hardware components that do not compromise the portability of the RPSA MOC 38.

Figure 7:
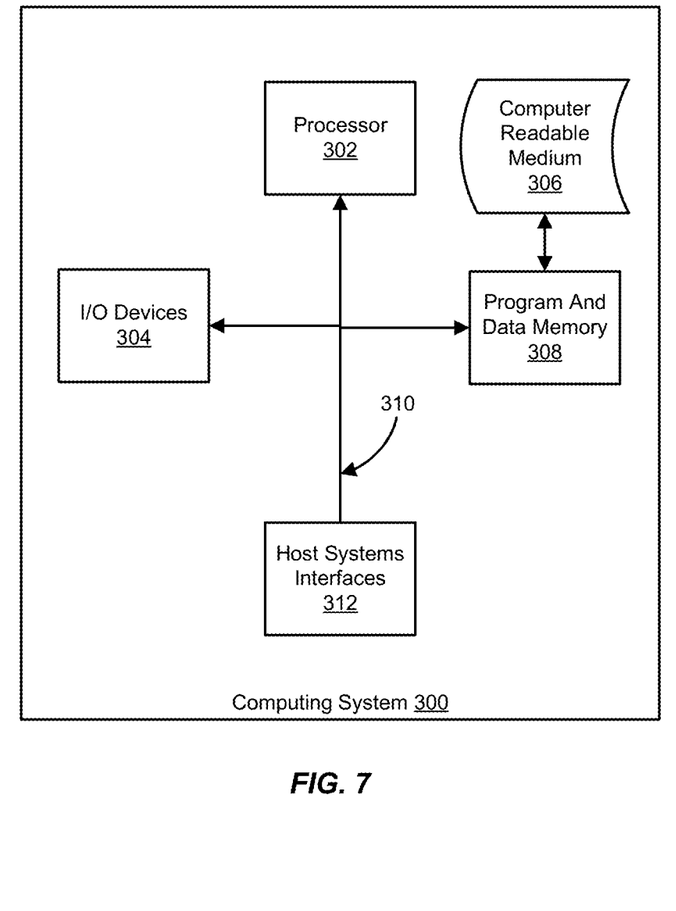
FIG. 7 is a block diagram of an exemplary computing system comprising a non-transitory computer readable medium that may be used in implementing an MPC.

The embodiments herein can take the form of hardware, software (including firmware, resident software, microcode, etc.), or any combination thereof. FIG. 7 illustrates a computing system 300 in which a computer readable medium 306 may provide instructions for performing any of the processes disclosed herein.

Furthermore, the embodiments can take the form of a computer program product accessible from the computer readable medium 306 providing program code for use by or in connection with a computer or any instruction execution system. For the purposes of this description, the computer readable medium 306 can be any apparatus that can tangibly store the program code for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk, and an optical disk. Some examples of optical disks include compact disk-read only memory (CD-ROM), compact disk-read/write (CD-R/W) and digital versatile disk (DVD).

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output (I/O) devices 304 (including but not limited to keyboards, displays, pointing devices, etc.) can be coupled to the computing system 300 either directly or through intervening I/O controllers. Network adapters may also be coupled to the computing system 300 to enable the computing system 300 to become coupled to other data processing systems, such as through host systems interfaces 312, and/or remote printers or storage devices through intervening private or public networks. Modems, cable modems and Ethernet cards are just a few of the currently available types of network adapters.

What is claimed is:
1. A system, comprising:
   a multistep plant; and
   a model predictive controller (MPC) comprising a model of the multistep plant, wherein the MPC is operable to linearize at least two steps of the multistep plant into cycle steps based on the model, to process an output signal from the multistep plant, and to independently control the cycle steps based on the output signal to optimize an output of the multistep plant.

2. The system of claim 1, wherein:
the cycle steps comprise durations, and the MPC is further operable to independently vary the durations of the cycle steps.

3. The system of claim 1, wherein:
the MPC comprises a Kalman filter operable to predict processing changes in the multistep plant based on operating conditions of the multistep plant, and to estimate initial conditions of the cycle steps.

4. The system of claim 3, wherein:
the MPC further comprises an optimization module operable to perform a convex quadratic operation on the initial conditions of the cycle steps to generate control signals that independently control the cycle steps.

5. The system of claim 1, wherein:
at least a portion of the MPC comprises firmware implemented in an embedded controller.

6. The system of claim 1, wherein:
the multistep plant comprises one or more of a hydrogen separation plant, an air pre-purification plant, a carbon dioxide capture processing plant, an air separation processing plant, and a cardiac device.

7. The system of claim 1, wherein:
the multistep plant comprises a medical oxygen concentrator (MOC) operable to produce oxygen from ambient air.

8. The system of claim 7, wherein:
the MOC uses a cyclic multistep Rapid Pressure Swing Adsorption (RPSA) process to produce the oxygen.

9. The system of claim 8, wherein:
the RPSA process comprises one or more of a Pressure Swing Adsorption (PSA), a Temperature Swing Adsorption (TSA), a Vacuum Swing Adsorption (VSA), and a Vacuum Pressure Swing Adsorption (VPSA).

10. The system of claim 7, wherein:
the MPC is operable to optimize a product composition and a tank pressure of the MOC with each cycle step.

11. The system of claim 1, wherein:
the MPC is further operable to perform a system identification of the multistep plant using a plurality of Pseudo-Random Binary Sequences to stimulate the at least two steps of the multistep plant.

12. The system of claim 1, wherein:
the MPC is operable to process a plurality of output signals from the multistep plant to independently control the cycle steps of the multistep plant.

13. A method operable with a multistep plant, comprising:
generating a model of the multistep plant; and
via a model predictive controller (MPC):
linearizing at least two steps of the multistep plant into cycle steps based on the model;
processing an output signal from the multistep plant; and
independently controlling the cycle steps based on the output signal to optimize an output of the multistep plant.

14. The method of claim 13, wherein:
the cycle steps comprise durations, and the method further includes, via the MPC independently varying the durations of the cycle steps.

15. The method of claim 13, further comprising:
predicting processing changes in the multistep plant based on operating conditions of the multistep plant via a Kalman filter; and
estimating initial conditions of the cycle steps.

16. The method of claim 15, further comprising:
performing a convex quadratic operation on the initial conditions of the cycle steps to generate control signals that independently control the cycle steps via an optimization module.

17. The method of claim 13, wherein:
at least a portion of the method is implemented as firmware in an embedded controller.

18. The method of claim 13, wherein:
the multistep plant comprises one or more of a hydrogen separation plant, an air pre-purification plant, a carbon dioxide capture processing plant, an air separation processing plant, and a cardiac device.

19. The method of claim 13, wherein:
the multistep plant comprises a medical oxygen concentrator (MOC) operable to produce oxygen from ambient air.

20. The method of claim 19, wherein:
the MOC uses a cyclic multistep Rapid Pressure Swing Adsorption (RPSA) process to produce the oxygen.

21. The method of claim 20, wherein:
the RPSA process comprises one or more of a Pressure Swing Adsorption (PSA), a Temperature Swing Adsorption (TSA), a Vacuum Swing Adsorption (VSA), and a Vacuum Pressure Swing Adsorption (VPSA).

22. The method of claim 19, further comprising:
optimizing a product composition and a tank pressure of the MOC with each cycle step.

23. The method of claim 13, further comprising:
performing a system identification of the multistep plant using a plurality of Pseudo-Random Binary Sequences to stimulate the at least two steps of the multistep plant.

24. The method of claim 13, further comprising:
processing a plurality of output signals from the multistep plant to independently control the cycle steps of the multistep plant.

25. A non-transitory computer readable medium, comprising instructions that, when executed by a model predictive controller (MPC), direct the MPC to:
generate a model of a multistep plant; and
linearize at least two steps of the multistep plant into cycle steps based on the model;
process an output signal from the multistep plant; and
independently control the cycle steps based on the output signal to optimize an output of the multistep plant.

26. The non-transitory computer readable medium of claim 25, wherein:
the cycle steps comprise durations, and the non-transitory computer readable medium further comprises instructions that direct the MPC to independently vary the durations of the cycle steps.

27. The non-transitory computer readable medium of claim 25, further comprising instructions that direct the MPC to:
predict processing changes in the multistep plant based on operating conditions of the multistep plant via a Kalman filter; and
estimate initial conditions of the cycle steps.

28. The non-transitory computer readable medium of claim 27, further comprising instructions that direct the MPC to:
perform a convex quadratic operation on the initial conditions of the cycle steps to generate control signals that independently control the cycle steps via an optimization module.

29. The non-transitory computer readable medium of claim 25, wherein:

at least a portion of the instructions are implemented as firmware in an embedded controller.

30. The non-transitory computer readable medium of claim 25, wherein:
the multistep plant comprises one or more of a hydrogen separation plant, an air pre-purification plant, a carbon dioxide capture processing plant, an air separation processing plant, and a cardiac device.

31. The non-transitory computer readable medium of claim 25, wherein:
the multistep plant comprises a medical oxygen concentrator (MOC) operable to produce oxygen from ambient air.

32. The non-transitory computer readable medium of claim 31, wherein:
the MOC uses a cyclic multistep Rapid Pressure Swing Adsorption (RPSA) process to produce the oxygen.

33. The non-transitory computer readable medium of claim 32, wherein:
the RPSA process comprises one or more of a Pressure Swing Adsorption (PSA), a Temperature Swing Adsorption (TSA), a Vacuum Swing Adsorption (VSA), and a Vacuum Pressure Swing Adsorption (VPSA).

34. The non-transitory computer readable medium of claim 31, further comprising instructions that direct the MPC to:
optimize a product composition and a tank pressure of the MOC with each cycle step.

35. The non-transitory computer readable medium of claim 25, further comprising instructions that direct the MPC to:
perform a system identification of the multistep plant using a plurality of Pseudo-Random Binary Sequences to stimulate the at least two steps of the multistep plant.

36. The non-transitory computer readable medium of claim 25, further comprising instructions that direct the MPC to:
a plurality of output signals from the multistep plant to independently control the cycle steps of the multistep plant.

* * * * *